United States Patent [19]

Salle

[11] 4,157,136

[45] Jun. 5, 1979

[54] TORQUE RESPONSIVE CENTRIFUGAL CLUTCH

[75] Inventor: Ralph D. Salle, Lake Zurich, Ill.

[73] Assignee: Borg-Warner Corporation, Chicago, Ill.

[21] Appl. No.: 831,728

[22] Filed: Sep. 9, 1977

[51] Int. Cl.² .................. F16D 43/14; F16H 45/02
[52] U.S. Cl. .................. 192/103 B; 192/3.31; 192/55; 192/91 A
[58] Field of Search .................. 192/3.28, 3.29, 3.3, 192/3.31, 54, 55, 105 BA, 103 B, 91 A

[56] References Cited

U.S. PATENT DOCUMENTS

| | | | |
|---|---|---|---|
| 2,230,293 | 2/1941 | Harris | 192/105 BA X |
| 2,235,673 | 3/1941 | Dodge | 192/3.31 |
| 3,145,817 | 8/1964 | Randall | 192/105 BA |
| 3,717,229 | 2/1973 | Perlick | 192/54 |
| 3,779,355 | 12/1973 | Okuno | 192/105 BA |

Primary Examiner—Benjamin W. Wyche
Attorney, Agent, or Firm—Robert L. Zieg

[57] ABSTRACT

A friction shoe assembly for a speed-responsive clutch adapted for use in a hydrodynamic device to couple turbine and impeller members including a disc secured to the turbine member having a series of cam surfaces thereon formed in apertures in the discs. The friction shoe assemblies are mounted in the apertures in engagement with the cam surfaces. The friction shoe assemblies engage with the impeller at a predetermined speed of rotation of the turbine member, and the cam means induces a wedging engagement of the shoes with the impeller member. The shoe assemblies include a spring mounted roller secured thereto to provide a torque limit for the clutch and include a streamlined shoe body manufactured of sheet metal providing a streamlined configuration toward the oncoming oil stream.

7 Claims, 5 Drawing Figures

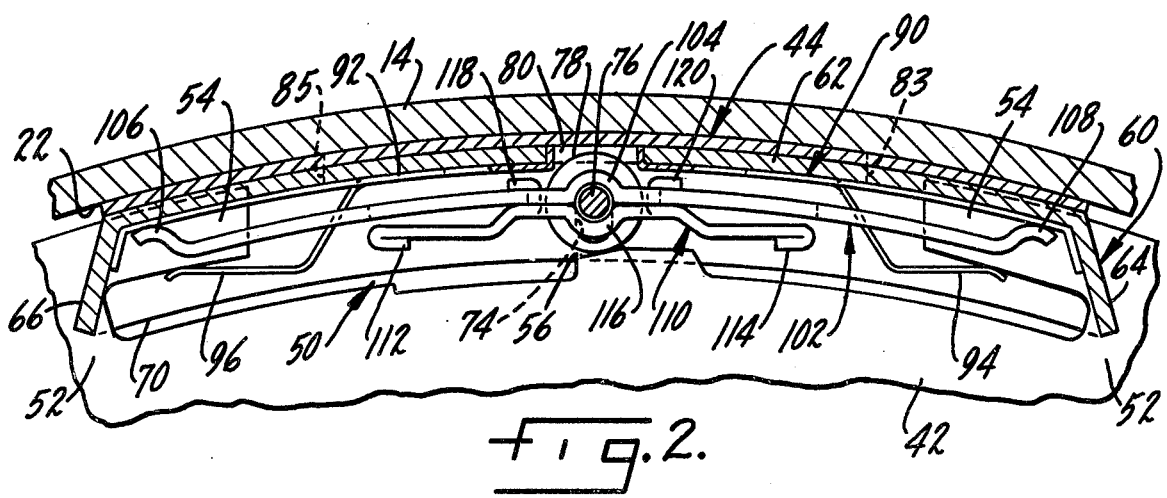
_fig.2._
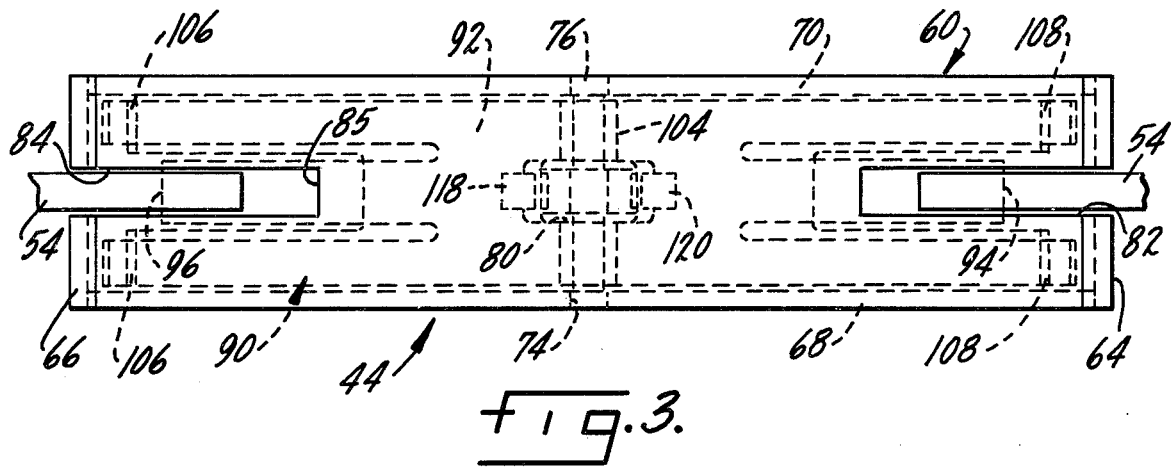
_fig.3._
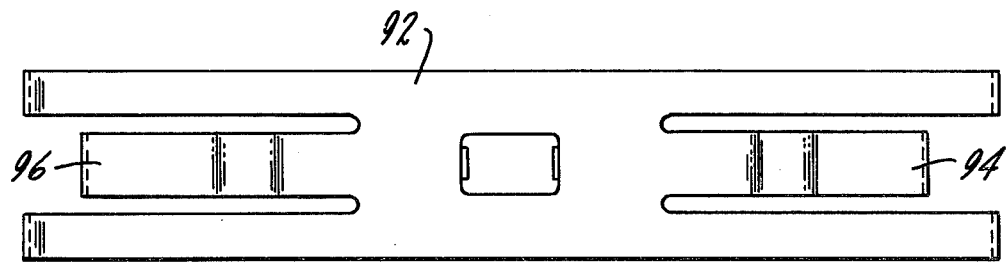
_fig.4._
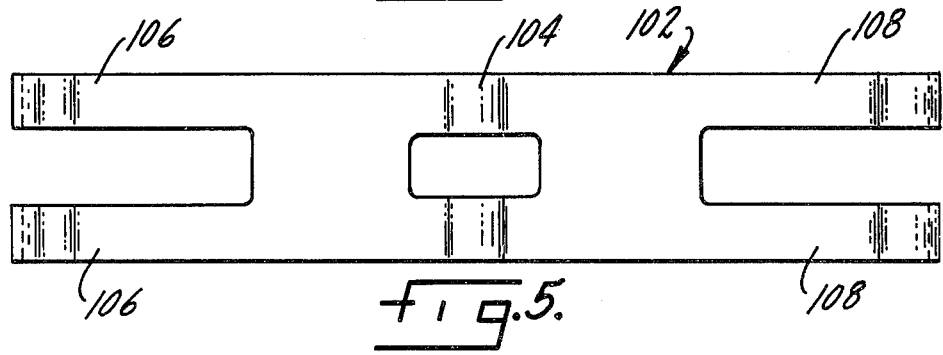
_fig.5._

TORQUE RESPONSIVE CENTRIFUGAL CLUTCH

BACKGROUND OF THE INVENTION

1. Field of the Invention

This application relates to the field of speed-responsive engaging devices for hydrodynamic devices.

2. Prior Art

It is known in the prior art to provide lock-up clutches for hydrodynamic devices. More particularly, copending application, Ser. No. 754,935 filed Dec. 28, 1976 of common assignee provides a clutch mechanism for hydrodynamic devices having a shoe assembly having a roller therein and engaged by centrifugal force and, in addition, engaged by the wedging effect of a cam surface on the roller mechanism and such clutch devices lock together the impeller and turbine elements to improve efficiency by eliminating slippage. In addition, that application provides for a spring mounted roller to provide a torque limit on the clutch so that it is possible for the clutch to disengage when desired. Also the prior method of construction of the shoes for such clutches require certain joining techniques such as weldig, etc. to join the assembly together.

It has been recognized that a design of shoe is needed to provide for a streamlined shape whereby in meeting the oncoming oil stream it can be shaped to release when desired and further a simple way of assembly is required to reduce cost.

SUMMARY OF THE INVENTION

The present invention solves the problems recognized above and provides an improved clutch mechanism for a hydrodynamic device in which there is a means to limit the torque which can be developed by the self-energizing feature of the assembly. The torque limiting structure is comprised of a spring mounting between the roller and the shoe assembly. The shoe is manufactured of sheet metal in a streamlined shape whereby easy release is obtained and further the mounting of the various parts in the shoe assembly is such that the roller axle holds all pieces in assembly eliminating the need for welding or riveting of parts.

BRIEF DESCRIPTION OF THE DRAWINGS

FIG. 2 is a sectional view taken along the lines 2—2 of FIG. 1;

FIG. 3 is a top view of the shoe assembly of FIG. 2;

FIG. 4 is a top view of the main spring for the shoe assembly; and

FIG. 5 is a top view of the retractor spring for the shoe assembly.

BRIEF DESCRIPTION OF THE PREFERRED EMBODIMENT

Figure 1:
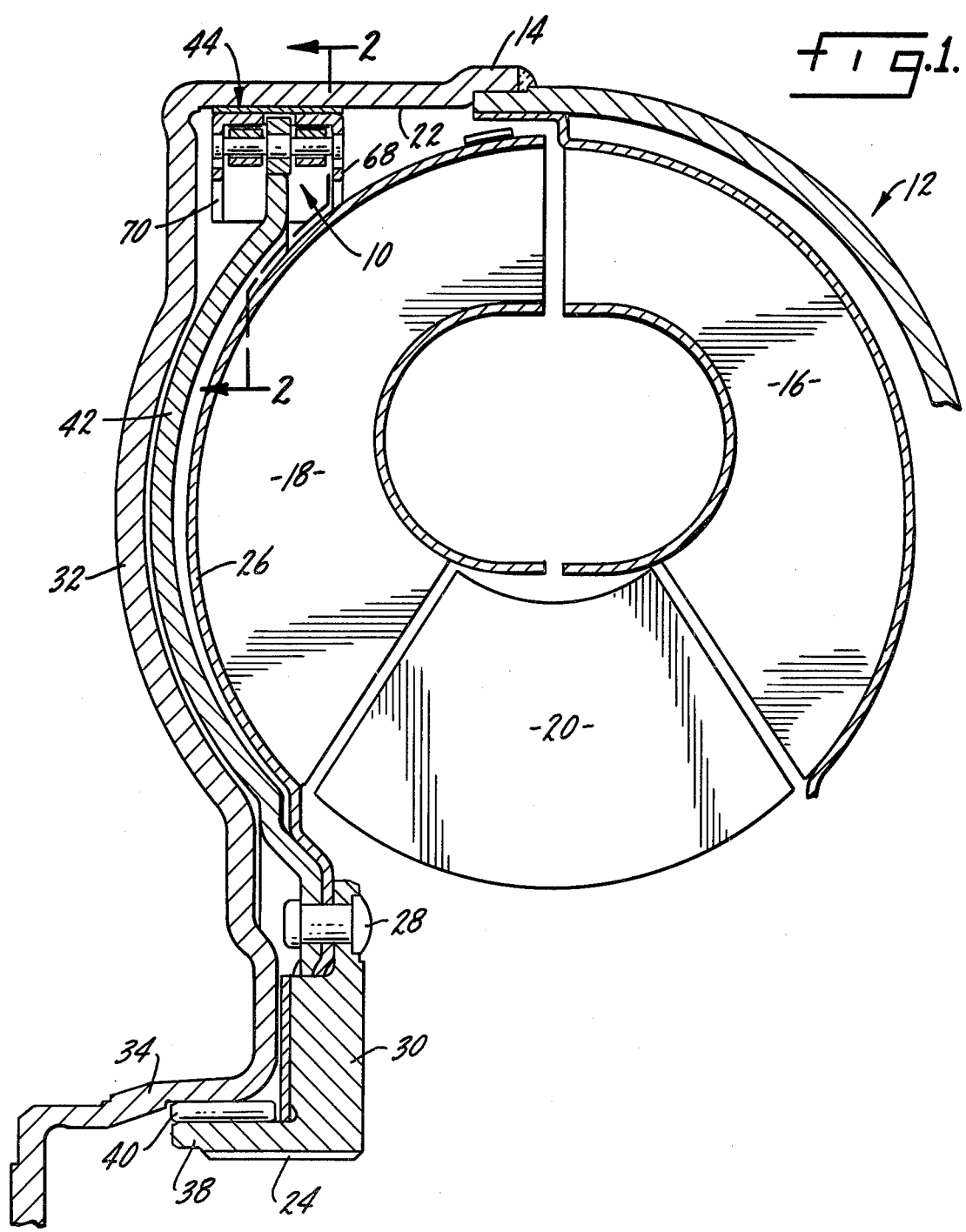
FIG. 1 is a cross-sectional view through a clutch mechanism for a hydraulic torque converter.

Referring to FIG. 1, an improved lock-up clutch or engaging mechanism 10 is disclosed. Clutch 10 is shown in a hydrodynamic device 12 which may be a hydraulic torque converter having a drive shell 14 connected to drive a vaned impeller member 16. Torque converter 12 includes a vaned turbine member 18 driven hydrodynamically by impeller 16 and includes a stator member 20. The improved lock-up clutch 10 is operative to lock the turbine to the impeller by means of frictional engagement between clutch 10 and an inner annular surface 22 in shell 14.

Turbine 18 includes an outer radial vaned portion 26 which is connected to a hub 30 by rivets 28. Hub 30 is splined at 24 to be connected to a transmission input shaft as is known in the art. Drive shell 14 includes a radially extending portion 32 connected to a central hub 34 which may be driven by the engine of the vehicle. Hub 30 of turbine 18 includes an axially extending bearing portion 38. A bearing 40 is provided mounting hub 30 within hub portion 34. Turbine 18 is thus mounted for concentric rotation within shell 14 to provide for concentric rotation between the turbine and impeller 16 and drive shell 14.

The unique clutch 10 of the present invention is comprised of an annular curved disc 42 and friction devices or shoe assemblies 44. Disc 42 is concentrically mounted upon turbine hub 30 and is secured thereto by rivets 28. Annular discs 42 is curved to conform with the shape and curvature of turbine 18 and radial portion 32 to provide minimum space requirements for clutch mechanism 10 within torque converter 12. As illustrated in FIG. 2, disc 42 has a series of apertures 50 in which shoe assemblies 44 are mounted. Apertures 50 includes a series of T-shaped projections 52 which define tabs 54 extending radially toward the center of apertures 50. Tabs 54 have cooperative engagement with shoe assemblies 44 to retain same on discs 42. Also provided centrally of apertures 50 is a cam surface 56, also referred to as a wedge or ramp surface. The cam surfaces 56 have a relatively slight curvature to maintain a relatively uniform wedge angle as is more particularly described in copending application Ser. No. 700,998; filed June 29, 1976; of common assignee.

Shoe assemblies 44 are comprised of a rectangular friction shoe body 60 being generally arcuate in cross-section to conform with the arcuate shape of surface 22. The shoe bodies 60 as indicated, are made of sheet metal and include a relatively flat arcuate portion 62 and end portions 64 and 66 which are formed by bending end portions of the body 60 downwardly from normal position, which would be a continuation of the shape of portion 62. Also provided longitudinally of the shoe body 60 are formed flanges 68 and 70 which are bent out of the surface of the main portion of the shoe body as best shown in FIG. 1. End portions 64 and 66 are bent down till they engage flange portions 68 and 70. Thus, the shoe body 60 is of a generally rectangular inverted cup shape as viewed in FIG. 2. Provided in the flanges 68 and 70 are slots 74 adapted to receive the roller axle 76. The roller axle has mounted thereon a wheel or roller 78. In the main portion 62 of shoe 60 is also provided a rectangular slot 80 to accomodate the roller 78.

The slot 74 for the axle 76 is larger than the diameter of the axle allowing for motion of the axle within the slot in a direction transverse to the general plane of the shoe assembly 44. Thus, the roller and axle can move up and down with respect to the main portion 62 of the shoe 60.

The shoe body 60 further has longitudinal end slots 82 and 84 which accomodate the thickness of the tabs 54 on disc 42 so that the shoe assembly 44 may be mounted within apertures 50. Provided in the shoe 60 is a sheet metal retainer or leaf type retractor spring 90 which has a main body portion 92 generally shaped to conform to the interior of the shoe body 60, as best illustrated in FIG. 2. Severed from either end of spring retainer 90 are a pair of arms 94 and 96 which engage the lower surfaces of tabs 54 when the shoe assemblies 44 are mounted in apertures 50, and thus serve to urge the shoe assemblies 44 downwardly toward the center of rotation in the aperture 50 and also resist outward movement of the shoes 44 in opposition to centrifugal force. Thus the spring devices 90 retain the shoes 44 within aperture 50. The width of the arms 94 and 96 which are severed from the main body 92 of spring 90 are generally in conformance with the thickness of the tabs 54 within which they engage.

Also provided within the shoe assembly 44 is a main spring 102. The main spring 102 includes an axle receiving portion of arcuate configuration 104 and has pairs of end portions 106 and 108 which engage with a part of the retractor spring 90 and thereby engage the shoe body 60. The main spring 102 thus urges the axle 76 downwardly onto the cam 56 as will be described later. Provided within the shoe assembly 44 are also sheet metal weights 110, which comprise a device having folded arm portions 112 and 114 to add weight to the structure and have an axle receiving arcuate portion 116 which together with portion 104 of main spring 102 defines a bearing assembly for the axle 76. The weight members 110 have sheet metal prongs 118 and 120 thereon which extend through slots in the main spring 102 and are bent over as illustrated to secure the weights 110 to the main springs 102.

Thus the unique shoe assembly 44 comprises an assembly which is secured together without welding, riveting or other such joining techniques. The interaction of the main spring 102 and the slot provided in flanges 70 and 68 of shoe body 60 serve to retain the various parts of the shoe assemblies 44 in position.

The operation of the device of the present invention is generally similar to that described with respect to the aforementioned copending application, Ser. No. 754,935 filed Dec. 28, 1976, and reference may be had to that application for a detailed description of the operation. In general the operation is that when the parts are at rest, or under idle conditions, the retractor springs 90 will pull the shoe assemblies 44 down in apertures 50 with rollers 78 in engagement with cams 56. When a predetermined speed of rotation is reached, the shoe assembly 44 will move out to an extent to engage surface 22 in shell 14. The shell 14 moving faster at this time than the disc 42 and turbine 18. The relative movement between the shell 14 and the disc 42 will move shoe assemblies 44 clockwise, as viewed in the drawings, the roller 78 moving along cam surface 56 and performing a wedging action as described in the aforementioned application which tends to produce a self-energizing feature increasing the torque capacity of the clutch by means of the cam-wedging action.

The roller is used to provide for minimum friction between the shoe assemblies and the cam surface 56 as has been found beneficial in torque converter clutches of this type. Normally the torque capacity of the unit can increase as the wedging between the roller and cam increases. However, in the present application the unique torque limiting feature is provided in that when sufficient torque capacity of a predetermined amount has been obtained, the resistance to further wedging action of the rollers 78 and cam 56 will be such to create a force when exceeds the force of the main springs 102. When the force of the springs 102 is exceeded, the shoe 44 under increasing torque conditions can still move clockwise, with respect to the disc 42, however the roller 78 stays in its position on the cam 56 and moves relative to the shoe 60, the springs 102 flexing under this condition. Thus, when spring 102 begins to flex only a relatively slight increase in torque capacity between shoe assembly 44 and surface 22 can develop since additional force results in movement of roller 78 with respect to shoe assemblies 44 rather than significantly increasing the wedging effect. When additional torque tends to wedge the roller further, and spring 102 flexes, eventually a position of the shoe assembly 44 is reached wherein stop surface 85 engages with the end of the tabs 54, thus allowing no further arcuate movement of shoe 60. The only increase in engaging force possible at this point, is an increase in centrifugal force resulting from increased RPM of disc 42, since arcuate movement of shoe assemblies 44 is terminated with respect to disc 42.

When stop surface 83 engages the end of tab 54, a split power path, is derived through the clutch 10 in that part of the torque may be carried by the connection between stop surface 85 and tabs 54 and part may be carried by the rollers 78 and their engagement with the cam surface 56. This should result in increased life of the friction surfaces and the roller and cam surfaces since the loading on the roller and cam surface is reduced and no further axial displacement between shoe assemblies 44 and surface 22 is possible.

Thus, by use of main spring 102 and weight 110 mounting the roller axle 76 the maximum available torque which can be developed by the frictional engagement of surface 22 and shoe assembly 44 is limited depending upon the size or force of springs 102 utilized. In a very convenient manner, by easily varying the torque capacity of the clutch, each clutch can be individually tailored to a particular engine and automatic transmission combination to provide proper upshifts and downshifts in the automatic transmission as described in copending application Ser. No. 732,265 filed Oct. 14, 1976. The clutch will come out of the engagement when desired since the wedging effect is limited.

As described above the unique shoe assemblies 44 provide a means of streamlining the shoe assembly due to the depending portions 64 and 66. The portion 64 and 66 depending upon the direction of rotation, will meet the oncoming oil stream within the torque converter assembly 12. The shape and angle of the portion 64 and 66 may be varied to suit various conditions as well as varying the strength of spring 102 and the size of the weight 110. Thus, the shoe assembly 44 may be designed such that the shape of and angle of portion 64 and 66 when they meet the oncoming oil stream will assist in disengaging the shoe assembly 44 when the disengagement point is reached, to prevent any possibility of sticking or hesitancy of the shoe assembly to release from engagement. This along with the torque limiting feature described above and in the aforementioned application mentioned above will provide a unique shoe assembly for a torque converter clutch or for any centrifugally engaging clutch operating in a rotating mass of oil in which disengagement can be assured, which would otherwise be a problem in the wedging type structure described. Further, the assembly of the device is provided without any welding or riveting techniques due to the unique assembly of parts used in that the main spring 102 having secured thereto a sheet metal weight device 110 which together serve to journal roller axler 76 and with cooperation of flanges 68 and 70 secure the assembly together. The method of assembly after formation of the shoe body 60 would be to insert the retractor spring 90 and then insert the main spring 102 in engagement with retractor spring 90 as illustrated in FIG. 2 having previously secured to the main spring 102, the sheet metal weight 110. Then the roller 78 is positioned in slot 80 and the axle 76 may be slid through the journal provided by portions 104 and 116 of main spring 102 and weight 110 respectively and then into the slots 74 provided in the flanges 68 and 70. Thus all parts are secured together when the roller axle 76 is slid into the assembly.

Various of the features have been particularly shown and described; however, it should be obvious to one skilled in the art that modifications may be made therein without departing from the scope of the invention.

What is claimed is:

1. An engaging mechanism operating in a fluid environment comprising, first and second relatively rotatable members, an annular disc fixed to said first member, a plurality of streamlined shaped sheet metal shoe assemblies mounted in said disc, cam means on said disc, said assemblies including means in engagement with said cam means, centrifugal force acting to urge said assemblies into engagement with said second member at a given speed of rotation, said assemblies moving along said cam means after initial engagement whereby said devices are wedged between said disc and said second member to self-energize and increase the torque capacity of the clutch, torque limiting means associated with said cam and assemblies operating to limit the torque capacity of the clutch developed by said self-energizing feature, and said streamlined shape cooperating with said fluid environment during operation to assist in disengaging said shoes from the wedging position.

2. A mechanism as claimed in claim 1 wherein said assemblies include roller mechanisms engaging the cam and said torque limiting means includes spring means mounting said rollers.

3. A mechanism as claimed in claim 2 wherein said shoe assemblies have a stop surface limiting the movement of the shoe assembly arcuately with respect to the disc.

4. A mechanism as claimed in claim 2 wherein said torque limiting means comprises a flexible spring and a weight on said shoe secured thereto together providing a journal for said roller mechanism, said spring flexing when the predetermined torque capacity is exceeded.

5. A shoe assembly for use in a clutch assembly having a cam surface and an engaging surface including a sheet metal body having depending flange and end portions forming a generally rectangular cup shaped configuration, an external arcuate surface on said shoe adapted to engage said engaging surface, and a main spring mounted in said shoe having means, comprised of a roller, an axle for said roller journalled in said main spring, to yieldably engage said cam.

6. A shoe assembly as claimed in claim 5 wherein said main spring includes a weight secured thereto, said weight and said spring and weight forming a journal for said axle.

7. A shoe assembly for use in a clutch assembly having a cam surface and an engaging surface including a sheet metal body having depending flange and end portions forming a generally rectangular cup shaped configuration, an external arcuate surface on said shoe adapted to engage said engaging surface, and a main spring mounted in said shoe having means therein to yieldably engage said cam, and including a leaf type retractor spring secured in said assembly by said main spring, said retractor spring engaging retaining means in said clutch to retain said shoe assemblies in said clutch.

* * * * *